United States Patent [19]

Norlin

[11] 4,114,937
[45] Sep. 19, 1978

[54] BUMPER ATTACHMENT
[75] Inventor: Stig Ivar Norlin, Trollhattan, Sweden
[73] Assignee: Saab-Scania Aktiebolag, Sodertalje, Sweden
[21] Appl. No.: 751,369
[22] Filed: Dec. 16, 1976
[30] Foreign Application Priority Data
Dec. 22, 1975 [SE] Sweden .............................. 7514504
[51] Int. Cl.² ............................................ B60R 19/02
[52] U.S. Cl. ................................................... 293/85
[58] Field of Search ..................... 293/84, 89, 90, 85, 293/88

[56] References Cited
U.S. PATENT DOCUMENTS

| 2,145,952 | 2/1939 | Ryan | 293/85 X |
|---|---|---|---|
| 3,146,013 | 8/1964 | Kappen | 293/89 X |
| 3,361,467 | 1/1968 | Ludwikowski | 293/88 X |
| 3,781,048 | 12/1973 | Oguma et al. | 293/85 |

*Primary Examiner*—Allen N. Knowles
*Assistant Examiner*—Edward M. Wacyra

*Attorney, Agent, or Firm*—Schiller & Pandiscio

[57] ABSTRACT

The invention relates to vehicle bumpers of the kind including attachment means in the form of energy-absorbing pivotable connections. In a collision the bumper height of the concerned vehicles can vary particularly if the following vehicle brakes just prior to impact and is hence nose down on its suspension at the moment of impact. The object of the invention is to provide a bumper arrangement which can swing upwardly or downwardly to reduce the possibility of severe chassis damage in the event of such an impact. The invention provides an arrangement in which each pivotable connection comprises two hinge-halves mounted on a pivot shaft, the bumper being attached to one hinge-half, and the other hinge-half being attached to the vehicle, and in which energy-absorbing elements are arranged between the hinge-halves. The energy-absorbing elements control upward and downward swinging movement of the bumper when subjected to an impact in dependence upon whether the impact occurs above, or respectively beneath, the horizontal central plane of the bumper.

3 Claims, 6 Drawing Figures

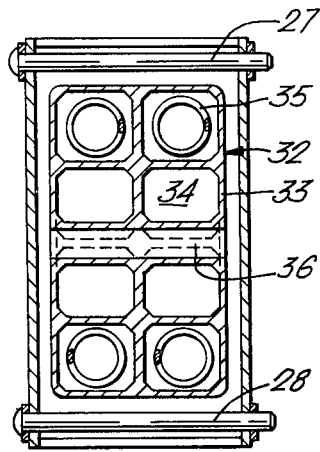
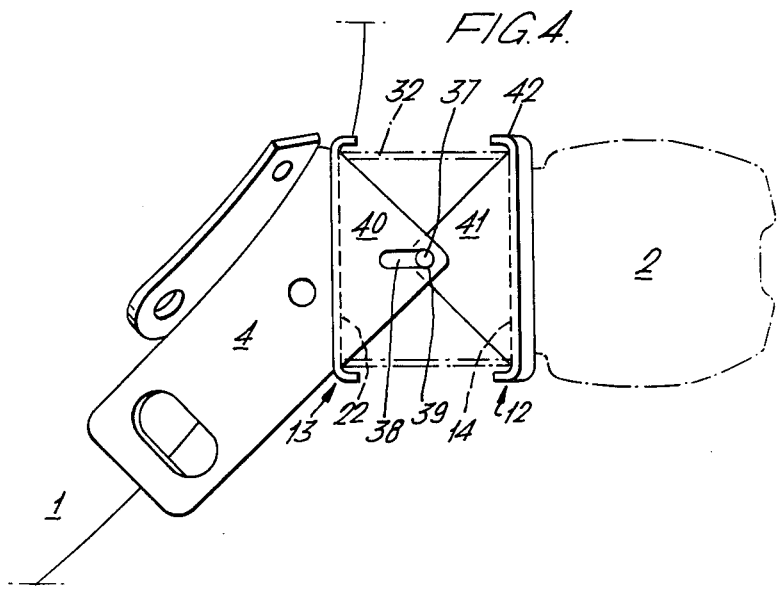

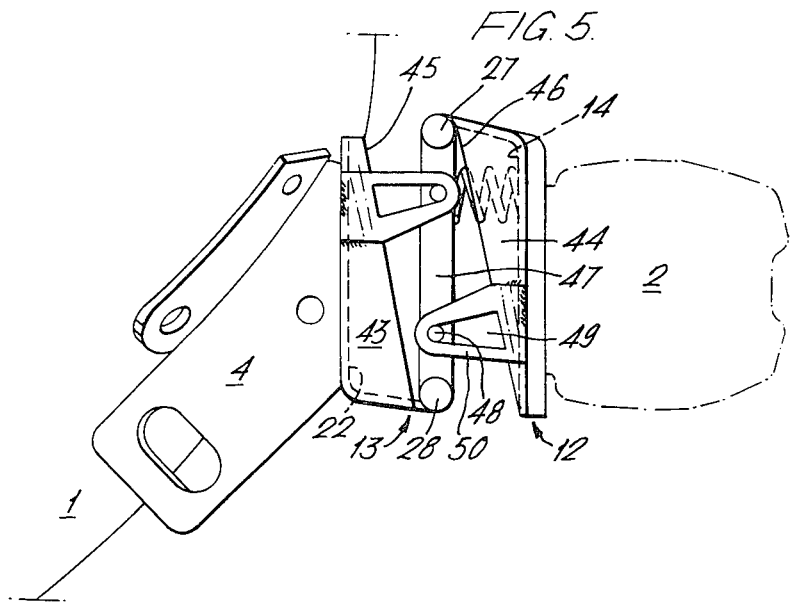
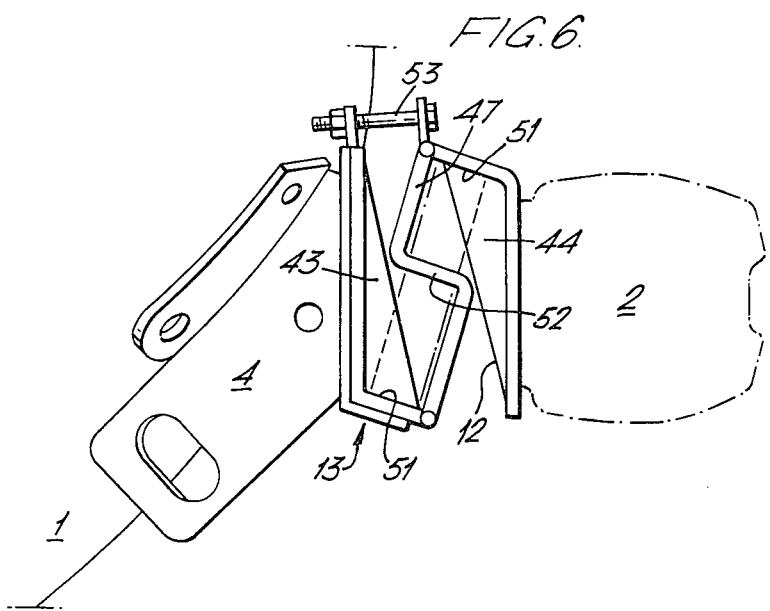

BUMPER ATTACHMENT

The present invention relates to arrangements for connecting bumpers to vehicles by means of energy-absorbing pivotable connecting means.

It is known to provide vehicles, particularly private cars, with energy-absorbing bumpers to prevent damage to the vehicle when said vehicle is involved in collisions of a minor nature. The ability of such bumpers to absorb energy, however, is necessarily restricted, since, for practical reasons the bumpers cannot be of excessively large volume. In order to improve the ability of such bumpers to absorb energy the means of connecting a plurality of known bumpers to respective vehicles have the form of so-called telescopic bumpers. The disadvantages encountered with such bumpers include their excessive weight, their high price and the fact that they require a large amount of space longitudinally. In addition, when the bumpers absorb energy as a result of their being subjected to asymmetrically distributed impact forces, a so-called desk-drawer effect may occur. Such an impact often takes place against the upper or lower edge of the bumper as a result of the vehicle being braked just prior to the impact, causing the vehicle to bob up and down so that the position of the vehicle bumper changes in relation to the plane of the surface on which the vehicle is being driven. Since the associated bumpers of two colliding vehicles can readily slide over or under each other, serious chassis damage to the vehicles can often result even in the case of light collisions.

An object of the present invention is to reduce or eliminate such disadvantages and the invention relates to an arrangement for connecting a bumper unit to a vehicle by means of at least one energy-absorbing, pivotable connecting device, the invention being mainly characterised by the fact that the connecting device comprises two hinge-halves which are pivotally journalled relative to each other about at least one shaft; in that the bumper unit is attached to one hinge-half while the other hinge-half is attached to the vehicle; and in that energy-absorbing elements are mounted between these two hinge-halves.

The invention is also characterised by the fact that the hinge-halves include support surfaces rigidly connected to the vehicle and to the bumper unit respectively, which support surfaces are arranged to adopt a substantially parallel position relative to one another, and in that the energy-absorbing elements between the hinge-halves permit, through compression, the support surfaces of said hinge-halves to approach each other both with and without simultaneous pivotal movement, to a position in which the support surfaces are not parallel, said pivotal movement occurring upon impact against the bumper unit above or beneath its horizontal central plane.

In a preferred embodiment of the arrangement according to the invention, the hinge-halves are pivotally connected to one another by means of an upper and a lower horizontal pivot shaft which extends through the connecting device parallel with said support surfaces. The energy-absorbing elements between the hinge-halves may comprise at least one cellular block of resilient material.

A connecting device according to the invention when combined with a bumper unit including impact-absorbing means in the form of cellular blocks or the like is much more able to absorb impact forces without subsequent damage.

Other features characteristic of the invention are disclosed in the following claims.

A number of exemplary embodiments of the invention will now be described with reference to accompanying drawings, in which:

FIG. 3 is a vertical sectional view taken through the line C—C in FIG. 1;

FIG. 4 is a side view of an arrangement according to the invention comprising a second embodiment of the connecting device;

FIG. 5 is a side view of an arrangement according to the invention comprising a third embodiment of the connecting device, and FIG. 6 is a side view of an arrangement according to the invention, comprising a fourth embodiment of the connecting device.

Figure 1:
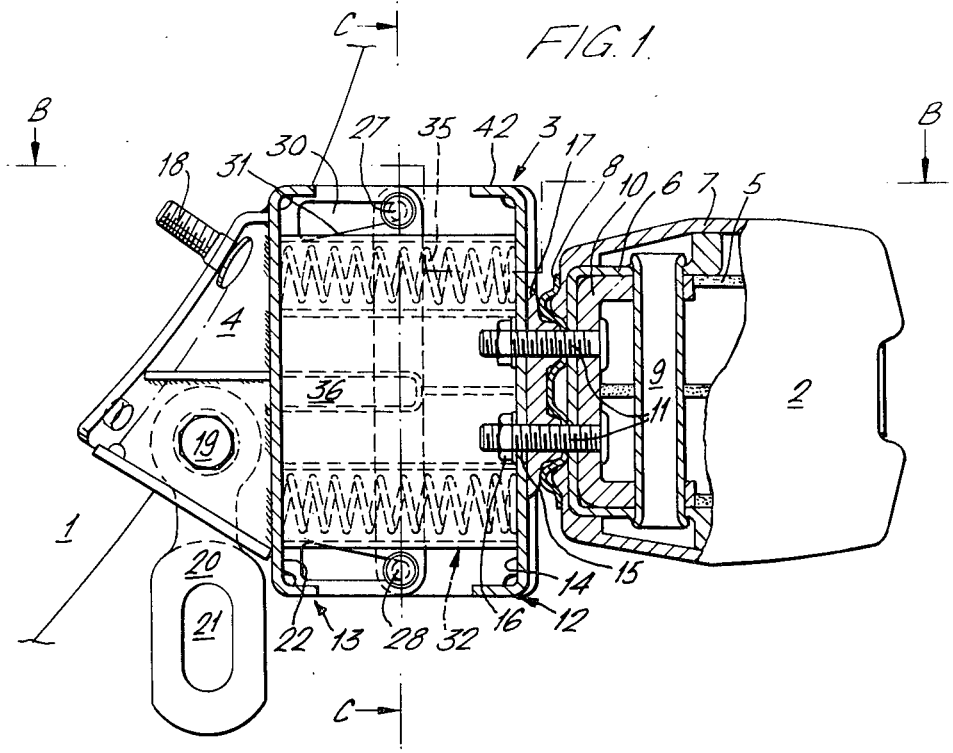
FIG. 1 is a side view of an arrangement according to the invention, comprising an advantageous embodiment of the connecting device, which together with adjacent parts of the bumper unit is shown in vertical section A—A according to FIG. 2.

In the embodiments of the arrangements according to the invention exemplified in the Figures, a longitudinally extending bumper unit 2 is connected to a vehicle 1 by means of three energy-absorbing connecting devices 3 between the bumper unit 2 and a support member 4 connected to the vehicle. The bumper unit 2 extends longitudinally over the width of the vehicle and, in the illustrated embodiment, is of the type illustrated and disclosed in Swedish Pat. Specification No. 346267. Such a bumper 2 comprises energy-absorbing cellular blocks 5 which support against the web of a longitudinally extending U-beam 6, a protective casing 7 enclosing both the beam 6 and the cellular blocks 5. The protective casing 7 has a longitudinally open groove in its rear side, said groove being covered by a locking bar 8 which, by means of screws (not shown) tightens the protective casing 7 against the beam 6 to form the bumper unit 2. Arranged at each attachment point between the connecting device 3 and the bumper unit 2 is a tubular reinforcing element 9 which extends between the limbs of the beam 6, and a stirrup-shaped insert 10 fitted within the beam 6. The bumper unit 2 is fastened to respective connecting devices 3 by means of a number of bolts and nuts 11, 16, the bolts 11 passing freely through smooth holes in the insert 10, the U-beam 6 and the locking bar 8.

The connecting device 3 comprises two hinge-halves 12, 13 which are pivotally connected together and of which the outer hinge-half 12 relative to the vehicle includes a base plate 14 abutting the bumper unit 2, in which base plate smooth-surface holes 15 for the bolts 11 are arranged. The bumper unit 2 is fixedly connected to the connecting device 3 by means of nuts 16 cooperating with respective bolts 11. Arranged between the locking bar 8 of the bumper unit 2 and the base plate of the connecting device is an intermediate plate 17 which supports against the base plate 14 and which has a form corresponding to the form of the locking bar 8. In this way, the locking bar 8 is prevented from being deformed when the bolt and nut joint is tightened.

The inner hinge-half 13 relative to the vehicle 1 is attached to the support element 4 as by welding. The unit as a whole is attached to the vehicle 1 by means of screws 18 (only one of which is shown), the abutment surface of the support element 4 being adapted to the abutment surface of the vehicle 1. At the support element there is attached by a bolt 19 a downwardly extending attachment plate 20 having a hole 21 therein for securing a tow rope or the like.

A base plate 22 corresponding to the base plate 14 in the outer hinge-half 12 is arranged in the inner hinge-half 13. Both hinge-halves 12, 13 are of substantially rectangular shape with the base plates 14, 22 arranged in two substantially parallel vertical planes. The non-parallelism which may occur (see FIG. 2) is caused by the fact that the bumper unit 2 is shaped to gently follow the shape of the vehicle body. Such deviation of the base plates 14, 22 from mutual parallelism takes place particularly at the connecting devices adjacent the ends of the bumper unit 2.

Figure 2:
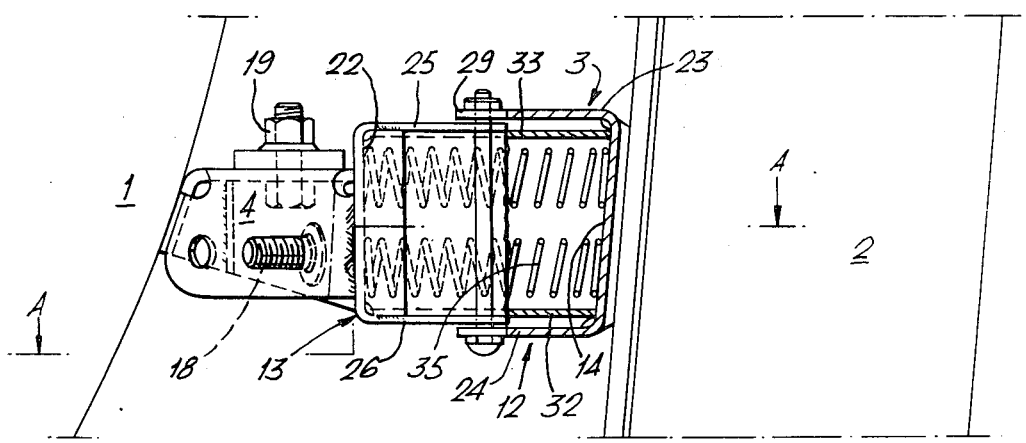
FIG. 2 is a horizontal sectional view taken through the line B—B in FIG. 1.

Substantially rectangular side plates 23, 24, 25, 26 are bent outwardly at right angles from the vertical edge surfaces of the base plates 14, 22. As shown in FIG. 2, the respective side plates 25, 26 of the inner hinge-half 13 are located within the respective side plates 23, 24 of the outer hinge-half 12, thereby permitting the inner hinge-half 13 to be pushed into the outer hinge-half 12. The hinge-halves 12, 13 are pivotally mounted relative to one another about two common pivot shafts 27, 28 which extend transversely of the side plates 23-26. The pivot shafts 27, 28 suitably have the form of cotter pins which pass through holes 29, 30 arranged in the side plates 23-26 of the hinge-halves 12, 13. The holes 29, 30 are arranged in the upper and lower inner corners of the side plates 23-26 respectively, the pivot shaft 27 adopting a position between the upper corner of the side plate furthest removed from respective base plates 14, 22 while the pivot shaft 28 takes a position between corresponding lower corners. The holes 29 in the outer hinge-half 12 are of circular shape, whilst the holes 30 in the inner hinge-half 13 are of elongated configuration with the long axis extending towards the base plate 22. The openings 30 are arranged to permit relative pivoting movements of the outer hinge-half 12 at the same time as the contact of the pivot shafts 27, 28 with the edges 31 of the elongated openings is intended to guide said pivotal movement.

Arranged between the two hinge-halves 12, 13 are elastic energy-absorbing elements 32. These may be of any type although they have preferably the form of a cellular block 33 made of a plastics material. Such a cellular block 33, shown in FIG. 3, is provided with cavities 34 which are either through-passing or extend towards a cross-wall, in which cavities coil springs 35 are arranged. It is not necessary to provide all of the cavities 34 with coil springs 35, although the positioning of said springs is, and should be, symmetrical with respect to the horizontal plane of symmetry of the connecting device 3. The energy-absorbing elements 32 are placed between the hinge-halves 12, 13 in a manner such that the longitudinal axes of the cavities 34, and therewith the longitudinal axes of the coil springs 35, extend perpendicularly to the base plates 14, 22.

The cellular block 33 is provided with a slot-like recess 36 perpendicular to the base plate 22 and in the vertical central position of the cellular block 33. The recess 36 extends to approximately the center of the cellular block 33 and enables a certain angular position to be obtained between the upper and lower portions of the cell block 33. This contributes toward the absorption of forces in respective halves of the cellular block without the occurrence of transverse disturbing forces, even when the cellular block 33 absorbs said forces asymmetrically.

FIGS. 4, 5 and 6 show three alternative embodiments of the arrangement according to the invention in which, similar to the described embodiment, a connecting device having two hinge-halves is arranged between the bumper unit 2 and the support element attached to the vehicle 1. The construction of the connecting devices of respective arrangements and the support elements are similar to the aforedescribed connecting device 3 and support element 4, and hence these components and those parts having previous correspondence are hereinafter identified by the same reference numerals. In the embodiments shown in FIGS. 4-6, the support element 4 is provided with a tongue having a hole therein for towing purposes.

In the embodiment shown in FIG. 4 the hinge-halves 12, 13 are provided with side plates 40, 41 bent perpendicularly to the base plates 14, 22. The hinge-halves 12, 13 are pivotally connected to each other about a single pivot shaft 37 extending transversely to the side plates 40, 41. The pivot shaft 37 has the form of a cotter pin which extends through holes 38, 39 arranged in respective side plates 40, 41. The side plates 40, 41 are in the form of isosceles triangles with the holes 38, 39 arranged in the mutually opposing top portions of the triangles. In the side plates 31 of the outer hinge-half 12, the holes 39 are of circular configuration, whilst the holes 38 in the side plates 40 of the inner hinge-half 13 are provided with openings elongated toward the base plate 22. The holes 39 guide the pivot shaft 37, and therewith also the outer hinge-half 12 and the bumper unit 2 during relative movements between the hinge-halves 12, 13 whilst absorbing impact forces.

As with the embodiments shown in FIGS. 1-3, the upper and lower edges of the base plates 14, 22 merge with horizontal flanges 42 which provide increased rigidity to said hinge-halves 12, 13. In the embodiment of FIG. 4, the flanges 42 also serve, together with the side plates 40, 41, to hold the deformation elements 32 between the base plates 14, 22.

A further embodiment of the arrangement according to the invention is shown in FIG. 5. Also in this embodiment the hinge-halves 12, 13 of the connecting device are provided with perpendicularly bent side plates 43, 44 both of which have substantially the form of a right-angled triangle and both of which are arranged such that the right-angles of respective triangles lie opposite each other on a common diagonal. The base plates 14, 22 of the hinge-halves 12, 13 are arranged to take a parallel position, the hypotenuses 45, 46 of said triangular-shaped side plates 33, 34 extending substantially parallel to one another. Each of the hinge-halves 12, 13 is pivotally mounted on a pivot shaft 27, 28 extending substantially perpendicular to the side plates 43, 44. Each pivot shaft 27, 28 is mounted in a respective corner of the side plates 43, 44 remote from respective base plates 14, 22. The pivot shafts 27, 28 are connected together via one or more link arms 47 having a substantially vertical extension.

Adjacent respective pivot shafts 27, 28, the link arms 47 are provided with outwardly extending pegs 48 which pass through elongated holes 49 in lugs 50 provided on respective side plates 43, 44. As with the previously described embodiments, the possible relative movement between the hinge-halves 12, 13 is limited through the co-operation between the pegs 48 and holes 49. As with previous embodiments, the starting position of the connecting device 3 as shown in FIG. 5 is maintained by the deformation elements 32 arranged between the hinge-halves 12, 13.

FIG. 6 shows a futher alternative embodiment of the connecting device according to the invention. Each of the hinge-halves 12, 13 is provided with a support surface 51 bent along one horizontal edge surface of the base plate 14, 22, said support surface adopting an oblique position relative to the horizontal plane. The hinge-halves 12, 13 are arranged opposite to one another and are pivotally mounted at the outer ends of said support surfaces 51 on respective pivot shafts 27, 28 between which a link mechanism 47 is arranged. In this way respective inner surfaces of the support surfaces 51 are arranged opposite each other and supports against each inner surface one end of an energy-absorbing element 32, the other end of which abuts a support surface 52 formed on the link arms 47. The support surface 52 has been provided by double-bending the link arms 47 connecting the pivot shafts 27, 28.

In order to hold the energy-absorbing elements together under a certain bias when the connecting device 3 occupies its normally inoperative position, the moveability of the outer hinge-half 12 relative to the inner hinge-half 13 is limited by means of a setting device 53 fixedly attached adjacent the hinge-halves 43, 44 said setting device comprising at least one setting screw wherewith the starting position of the outer hinge-half 44 can be set. When assembled on the vehicle, both the connecting device 3 and the setting device 53 are enclosed by a casing not shown.

The aforedescribed connecting devices 3 have the following mode of operation.

When the bumper unit 2 is subjected to a force which is uniformly distributed vertically, the symmetrically arranged deformation elements 32 absorb equally large forces, with the result tht the outer hinge-half 12 whilst absorbing said forces would be moved towards the inner hinge-half 13 whilst retaining its vertical position.

When the forces acting on the bumper unit 2 have an asymmetrical distribution vertically, the deformation elements 32 will also be subjected to an asymmetrical deformation. Depending upon where the resultant force of the forces emanating from the collision with the bumper unit 2 acts upon the connecting device 3, the bumper unit 2 will move either upwardly or downwardly. With respect to the embodiment shown in FIG. 4, it will be readily perceived that the bumper unit will move downwardly when the force-resultant acts beneath the pivot shaft 37, and that said bumper unit will move upwardly when said resultant acts above said pivot shaft. In the case of the remaining embodiments, the bumper unit will swing upwardly or downwardly when the force resultant acts above or beneath the central plane of the distance between the pivot shafts 27, 28. In practice, this means that the bumper unit will swing upwardly when the bumper unit is subjected to an impact above the horizontal central plane of the bumper unit, and will swing relatively downwardly when said impact acts beneath said central plane.

The invention is not restricted to the aforedescribed embodiments, since further modifications are conceivable within the scope of the following claims. Consequently, the energy-absorbing function of the bumper unit 2 and the connecting device 3 can be integrated in one unit, the connecting device being made longer and the deformation elements made larger in a corresponding manner. Such a device can itself form an independent bumper, the device then suitably being enclosed in a protective outer casing. The pivot shafts 27, 28, 37 forming part of the described arrangement need not be arranged centrally between the base plates 14, 22, but may, to advantage, be arranged at different distances therefrom. Further, the dimensions of the connecting device 3 in the longitudinal direction of the bumper unit may be selected freely, as can also the extent to which the connecting device is incorporated in the body of the vehicle.

I claim:

1. In an arrangement for connecting a bumper unit to a vehicle by means of at least one energy-absorbing, pivotable connecting device, the improvement wherein:
   (a) said connecting device comprises two hinge-halves which are pivotally mounted relative to one another about at least one pivot shaft, said hinge-halves comprising base plates (i) securely connected to said vehicle and said bumper unit, and (ii) being arranged to adopt a substantially parallel position relative to one another,
   (b) said bumper unit is attached to one of said hinge-halves, whilst the other hinge-half is attached to said vehicle, and
   (c) energy-absorbing elements comprising at least one resilient cellular block defining therein elongated cells open at at least one end thereof and arranged between said two hinge-halves, said energy-absorbing elements being arranged so as to permit, by compression, said base plates of said hinge-halves to approach each other both with and without simultaneous pivotal movement to a position in which said base plates are not parallel, said pivotal movement occurring when said bumper unit is subjected to an impact above or beneath its horizontal central plane.

2. In an arrangement according to claim 1, wherein said energy-absorbing elements include coil springs arranged in said cells, said coil springs being pretensioned to a certain extent when said connecting device is mounted.

3. In an arrangement according to claim 1, wherein said energy-absorbing cellular block is shaped to define at least one slot-like horizontal recess.

* * * * *